United States Patent
Raju et al.

(10) Patent No.: US 11,184,532 B1
(45) Date of Patent: Nov. 23, 2021

(54) PANORAMA CENTERING USER INTERFACE FOR CAMERA

(71) Applicant: QUALCOMM Incorporated, San Diego, CA (US)

(72) Inventors: Hariharan Raju, Hyderabad (IN); Raja Shekhar Reddy Annam, Hyderabad (IN); Ravi Shankar Kadambala, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/926,503

(22) Filed: Jul. 10, 2020

(51) Int. Cl.
| | |
|---|---|
| H04N 5/262 | (2006.01) |
| G06F 3/0482 | (2013.01) |
| H04N 5/232 | (2006.01) |
| G06F 3/0488 | (2013.01) |

(52) U.S. Cl.
CPC ... *H04N 5/23238* (2013.01); *H04N 5/232935* (2018.08); *H04N 5/2628* (2013.01); *G06F 3/0482* (2013.01); *G06F 3/04883* (2013.01)

(58) Field of Classification Search
CPC ......... H04N 5/23238; H04N 5/232935; H04N 5/2628; G06F 3/0482; G06F 3/04883
See application file for complete search history.

(56) References Cited

U.S. PATENT DOCUMENTS

| | | | |
|---|---|---|---|
| 9,088,714 B2 | 7/2015 | Doepke et al. | |
| 10,284,776 B2 | 5/2019 | Hirata et al. | |
| 10,482,644 B2 | 11/2019 | Li et al. | |
| 2011/0181687 A1 | 7/2011 | Yoshizumi | |
| 2014/0132708 A1* | 5/2014 | Kato | G06T 3/4038 348/36 |
| 2014/0240454 A1 | 8/2014 | Hirata et al. | |
| 2014/0300693 A1* | 10/2014 | Hirata | G03B 37/02 348/39 |
| 2015/0312478 A1* | 10/2015 | Barcovschi | H04N 5/23238 348/36 |
| 2018/0367777 A1 | 12/2018 | Li et al. | |
| 2019/0230284 A1 | 7/2019 | Arai et al. | |

FOREIGN PATENT DOCUMENTS

| | | |
|---|---|---|
| CN | 107765964 A | 3/2018 |
| CN | 109300182 A | 2/2019 |

OTHER PUBLICATIONS

International Search Report and Written Opinion—PCT/US2021/037691—ISA/EPO—dated Aug. 25, 2021.

* cited by examiner

*Primary Examiner* — Tsion B Owens
(74) *Attorney, Agent, or Firm* — QUALCOMM Incorporated (57) ABSTRACT

Aspects of the present disclosure relate to capturing panorama images using an image capture device including a camera. An example method includes receiving a user command to begin generation of a panorama image, capturing a plurality of images with the camera for generating the panorama image, while capturing the plurality of images, receiving an indication specifying a center region of interest (ROI), completing capture of the plurality of images, and automatically generating the panorama image based on the plurality of image, the panorama image centered at the specified center ROI.

30 Claims, 7 Drawing Sheets

PANORAMA CENTERING USER INTERFACE FOR CAMERA

TECHNICAL FIELD

This disclosure relates generally to systems and methods for image capture, and specifically generation of panorama images.

BACKGROUND

Many cameras are capable of generating panorama images. For example, many cameras in handheld devices such as mobile phones and tablets are capable of generating panorama images. Generation of such panorama images typically requires a user to rotate the camera while multiple images of the scene are captured. When the image captures are completed, the captured images may be combined into a single panorama image having a field of view (FoV) greater than the FoV of a single image captured. Such panorama images may have varying fields of view based on the captured images to be combined. For example, some panorama images may have a 360 degree FoV. A panorama image having a 360 degree FoV includes images captured during a full rotation of the camera by a user (such as a user spinning in place). A panorama image having a 360 degree FoV may be called a 360 degree panorama image. Other panorama images may have smaller fields of view (such as 180 degrees or otherwise).

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. The systems, methods, and devices of this disclosure each have several innovative aspects, no single one of which is solely responsible for the desirable attributes disclosed herein.

One innovative aspect of the subject matter described in this disclosure can be implemented as a method for generating a panorama image using an image capture device. The method can be performed by a suitable image capture device including a camera, and may include receiving a user command to begin generation of the panorama image, capturing a plurality of images using the camera for generating the panorama image, while capturing of the plurality of images, receiving an indication specifying a center region of interest (ROI), completing capture of the plurality of images, and automatically generating the panorama image based on the plurality of image, where the panorama image is centered at the specified center ROI.

In some aspects, the received indication may be a user input specifying the center ROI, such as a touch gesture on a touch sensitive user interface of the image capture device, such as a touch gesture at the center ROI on the touch sensitive user interface, or indicating selection of a menu option on the touch sensitive user interface while the camera is directed at the center ROI. In some aspects, receiving the indication may include automatically determining the center ROI based on one or more characteristics of the plurality of images, such as an estimated depth of one or more objects in the plurality of images. In some aspects, prior to receiving the user command, the method may include receiving user input configuring the device to operate in a mode configured to generate recentered panorama images.

In some aspects, the panorama image may be a 360 degree panorama image, and automatically generating the panorama image may include determining a split point corresponding to the specified center ROI, determining a starting capture point and an ending capture point based on the split point, and generating the panorama image based on the starting capture point and the ending capture point. In some aspects, the panorama image may be a less than 360 degree panorama image, and automatically generating the panorama image may include comparing the specified center ROI to a maximal field of view of the panorama image and cropping the panorama image to be centered at the specified center ROI.

Another innovative aspect of the subject matter described in this disclosure can be implemented in an image capture device. The image capture device can include one or more cameras, one or more processors and a memory storing instructions for execution by the one or more processors. Execution of the instructions may cause the image capture device to perform operations including receiving a user command to begin generation of a panorama image, capturing a plurality of images using the one or more cameras for generating the panorama image, while capturing the plurality of images, receiving an indication specifying a center region of interest (ROI), completing capture of the plurality of images, and automatically generating the panorama image based on the plurality of images, where the panorama image is centered at the specified center ROI.

In some aspects, the received indication may be a user input specifying the center ROI, such as a touch gesture on a touch sensitive user interface of the image capture device, such as a touch gesture at the center ROI on the touch sensitive user interface, or indicating selection of a menu option on the touch sensitive user interface while the camera is directed at the center ROI. In some aspects, receiving the indication may include automatically determining the center ROI based on one or more characteristics of the plurality of images, such as an estimated depth of one or more objects in the plurality of images. In some aspects, prior to receiving the user command, the method may include receiving user input configuring the device to operate in a mode configured to generate recentered panorama images.

In some aspects, the panorama image may be a 360 degree panorama image, and automatically generating the panorama image may include determining a split point corresponding to the specified center ROI, determining a starting capture point and an ending capture point based on the split point, and generating the panorama image based on the starting capture point and the ending capture point. In some aspects, the panorama image may be a less than 360 degree panorama image, and automatically generating the panorama image may include comparing the specified center ROI to a maximal field of view of the panorama image and cropping the panorama image to be centered at the specified center ROI.

Another innovative aspect of the subject matter described in this disclosure can be implemented in a non-transitory computer-readable storage medium storing instructions for execution by one or more processors of an image capture device including a camera. Execution of the instructions causes the image capture device to perform operations including receiving a user command to begin generation of the panorama image, capturing a plurality of images using the camera for generating the panorama image, while capturing of the plurality of images, receiving an indication specifying a center region of interest (ROI), completing capture of the plurality of images, and automatically generating the panorama image based on the plurality of image, where the panorama image is centered at the specified center ROI.

In some aspects, the received indication may be a user input specifying the center ROI, such as a touch gesture on a touch sensitive user interface of the image capture device, such as a touch gesture at the center ROI on the touch sensitive user interface, or indicating selection of a menu option on the touch sensitive user interface while the camera is directed at the center ROI. In some aspects, receiving the indication may include automatically determining the center ROI based on one or more characteristics of the plurality of images, such as an estimated depth of one or more objects in the plurality of images. In some aspects, prior to receiving the user command, the method may include receiving user input configuring the device to operate in a mode configured to generate recentered panorama images.

In some aspects, the panorama image may be a 360 degree panorama image, and automatically generating the panorama image may include determining a split point corresponding to the specified center ROI, determining a starting capture point and an ending capture point based on the split point, and generating the panorama image based on the starting capture point and the ending capture point. In some aspects, the panorama image may be a less than 360 degree panorama image, and automatically generating the panorama image may include comparing the specified center ROI to a maximal field of view of the panorama image and cropping the panorama image to be centered at the specified center ROI.

Another innovative aspect of the subject matter described in this disclosure can be implemented in an image capture device. The image capture device may include one or more cameras, means for receiving a user command to begin generation of a panorama image, means for capturing a plurality of images using the one or more cameras for generating the panorama image, means for, while capturing of the plurality of images, receiving an indication specifying a center region of interest (ROI), means for completing capture of the plurality of images, and means for automatically generating the panorama image based on the plurality of image, where the panorama image is centered at the specified center ROI.

BRIEF DESCRIPTION OF THE DRAWINGS

Aspects of the present disclosure are illustrated by way of example, and not by way of limitation, in the figures of the accompanying drawings and in which like reference numerals refer to similar elements.

DETAILED DESCRIPTION

Aspects of the present disclosure may be used for automatically generating a panorama image to be centered at a center region of interest (ROI) specified during generation of the panorama image. As described above, many image capture devices, such as cellular phones and tablets, include cameras and are capable of generating panorama images. Such panorama images may be generated based on images captured while a camera of the image capture device is rotated, for example by a user. The captured images may be processed and combined into a single panorama image. However, while a user may desire a panorama image to be centered at a particular point, such as when the camera is facing a specific person or landmark, in practice it may be difficult to generate panorama images centered at a particular point. For example, generating a 180 degree panorama image centered at a particular point requires a user to begin capturing images with the camera oriented 90 degrees from the desired center point, which may be difficult for the user to determine. Similarly, for 360 degree panorama images, the user may be required to begin capturing images with the camera oriented 180 degrees from the desired center point. For panorama images other than 360 degrees panorama images or 180 degrees panorama images, determining the proper start point may be even more difficult.

Methods and apparatus of the example implementations include receiving an indication that specifies a center region of interest (ROI) for a panorama image. The panorama image may then be generated to be centered at the specified center ROI. Such indications may include a user input, such as a touch gesture on a touch sensitive user interface of the image capture device, selection of a menu option on the touch sensitive user interface, or another suitable user input. Automatically generating the panorama image may include determining a split point for the captured panorama image, determining a starting capture point and an ending capture point of the panorama image based on the split point, and generating the panorama image based on the starting capture point and the ending capture point. The captured panorama images may be 360 degree panorama images or may have fields of view smaller than 360 degrees.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well-known circuits and devices are shown in block diagram form to avoid obscuring teachings of the present disclosure. Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Aspects of the present disclosure are applicable to any suitable image capture device (such as a security system with one or more cameras, smartphones, tablets, laptop computers, digital video and/or still cameras, web cameras, and so on) including one or more cameras and configured to or capable of capturing images or video. While described below with respect to an image capture device having or coupled to one camera, aspects of the present disclosure are applicable to devices having any number of cameras and are therefore not limited to devices having only one camera. Aspects of the present disclosure are applicable for devices configured to capture still images as well as capture video and may be implemented in devices having or coupled to cameras of different capabilities.

The term "device" or "image capture device" is not limited to one or a specific number of physical objects (such as one smartphone, one camera controller, one processing system and so on). As used herein, a device may be any image capture device with one or more parts that may implement at least some portions of this disclosure. While the below description and examples use the term "device" to describe various aspects of this disclosure, the term "device" is not limited to a specific configuration, type, or number of objects.

Figure 1:
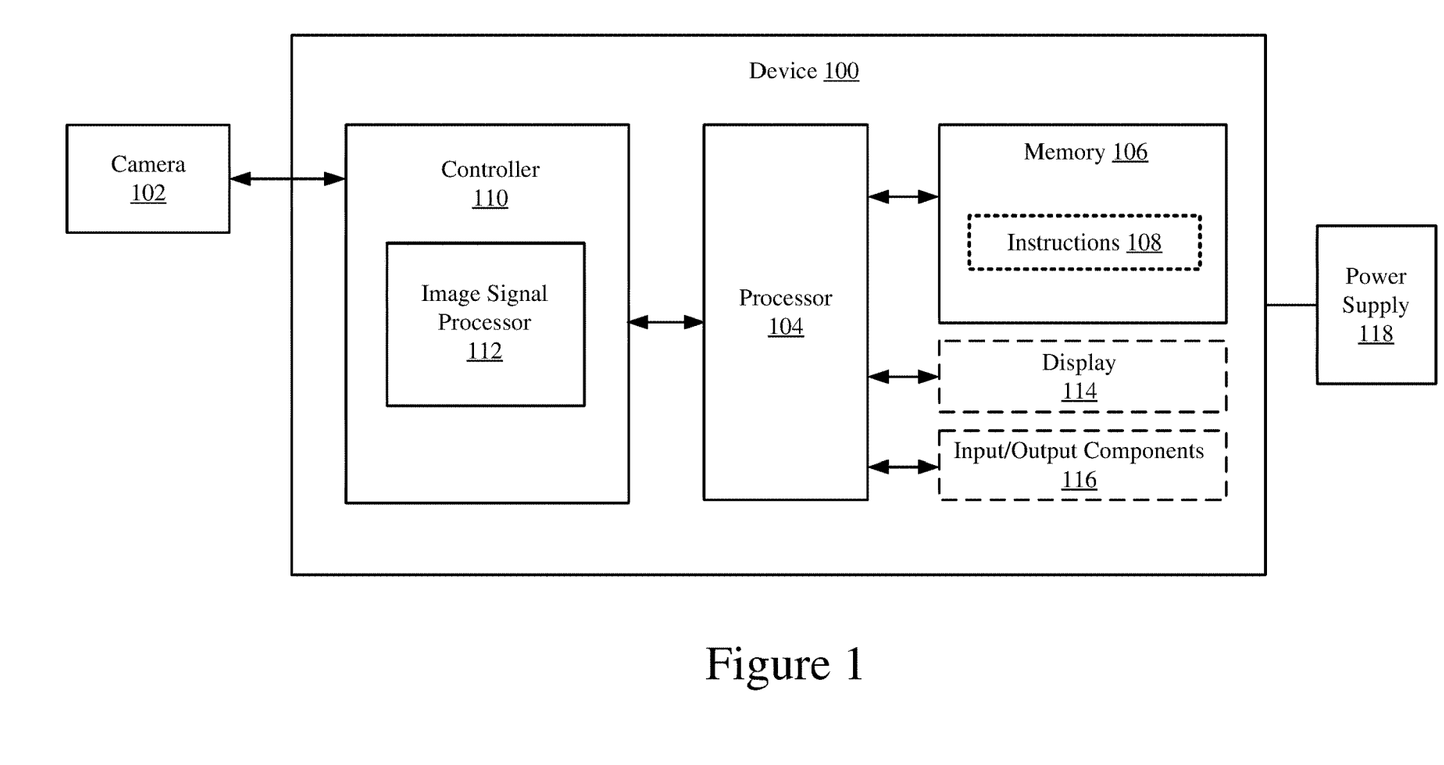
FIG. 1 is a block diagram of an example device configured to generate panorama images, according to some implementations.

FIG. 1 is a block diagram of an example device 100 configured to generate panorama images, according to some implementations. The example device 100 may include or be coupled to a camera 102, a processor 104, a memory 106 storing instructions 108, and a controller 110. In some implementations, the device 100 may include (or be coupled to) a display 114, and a number of input/output (I/O) components 116. The device 100 may also include a power supply 118, which may be coupled to or integrated into the device 100. The device 100 may include additional features or components not shown. For example, a wireless interface, which may include a number of transceivers and a baseband processor, may be included for a wireless communication device. In another example, the device 100 may include or be coupled to additional cameras other than the camera 102. The device 100 may also include or be coupled to one or more flashes, depth sensors, or other suitable imaging components.

The camera 102 may be any suitable camera capable of capturing individual image frames (such as still images) and/or capturing video (such as a succession of captured image frames). The camera 102 may include a single image sensor or be a dual camera module or any other suitable module with one or more image sensors, such as one or more CMOS image sensors.

The memory 106 may be a non-transient or non-transitory computer readable medium storing computer-executable instructions 108 to perform all or a portion of one or more operations described in this disclosure. The processor 104 may be one or more suitable processors capable of executing scripts or instructions of one or more software programs (such as instructions 108) stored within the memory 106. In some aspects, the processor 104 may be one or more general purpose processors that execute instructions 108 to cause the device 100 to perform any number of functions or operations. In additional or alternative aspects, the processor 104 may include integrated circuits or other hardware to perform functions or operations without the use of software.

While shown to be coupled to each other via the processor 104 in the example of FIG. 1, the processor 104, the memory 106, the controller 110, the display 114, and the I/O components 116 may be coupled to one another in various arrangements. For example, the processor 104, the memory 106, the controller 110, the display 114, and/or the I/O components 116 may be coupled to each other via one or more local buses (not shown for simplicity).

The display 114 may be any suitable display or screen allowing for user interaction and/or to present items (such as captured images, video, or a preview image) for viewing by a user. In some aspects, the display 114 may be a touch-sensitive display. The I/O components 116 may be or include any suitable mechanism, interface, or device to receive input (such as commands) from the user and to provide output to the user. For example, the I/O components 116 may include (but are not limited to) a graphical user interface, keyboard, mouse, microphone, and speakers, and so on. The display 114 and/or the I/O components 116 may provide a preview image to a user and/or receive a user input for adjusting one or more settings of the camera 102.

The controller 110 may include one or more controllers. The one or more controllers may be configured to control the camera 102. The controller 110 may include an image signal processor (ISP) 112, which may be one or more image signal processors to process captured image frames or video provided by the camera 102. In some aspects, the controller 110 or the ISP 112 may execute instructions from a memory (such as instructions 108 from the memory 106 or instructions stored in a separate memory coupled to the ISP 112). In other aspects, the controller 110 or the ISP 112 may include specific hardware. The controller 110 or the ISP 112 may alternatively or additionally include a combination of specific hardware and the ability to execute software instructions. For example, the ISP 112 may include or otherwise be configured to implement one or more stages of an image processing pipeline.

Figure 2:
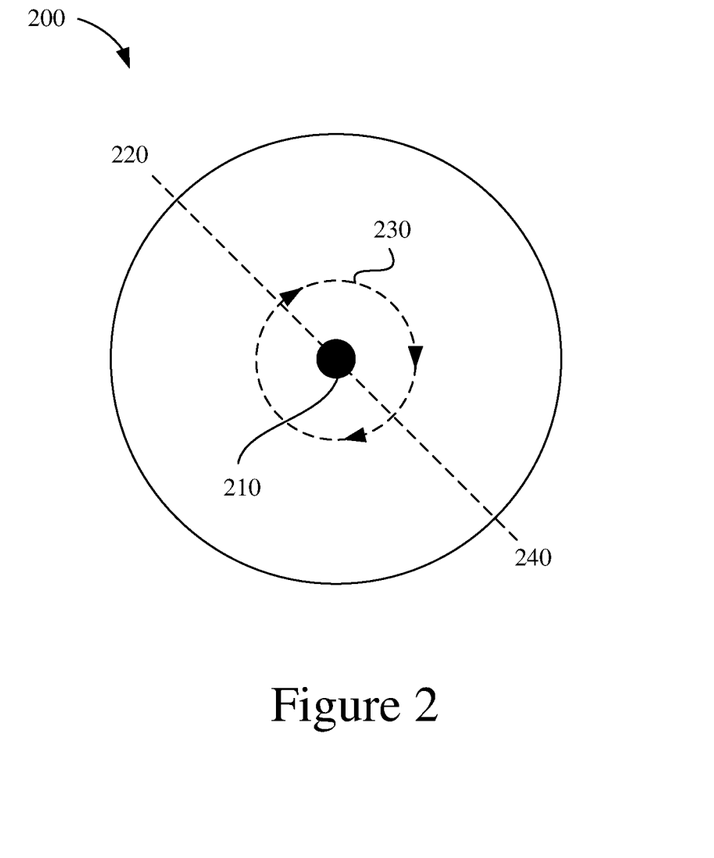
FIG. 2 shows a trajectory diagram of generating a conventional 360 degree panorama image

FIG. 2 shows a trajectory diagram 200 of generating a conventional 360 degree panorama image. The trajectory diagram 200 shows an overhead view of a user 210 initiating generation of a 360 degree panorama image while facing an optical axis of a camera at the starting point 220. The camera may be included in an image capture device. During generation of the panorama image, the user 210 rotates the camera to the right, clockwise in FIG. 2, along a path 230 for a full 360 degree rotation, until the optical axis is again facing the starting point 220. For example, the path 230 may be a horizontal path for a horizontal panorama image, a vertical path for a vertical panorama image, or any other suitable path. Further, note that while the path 230 is shown as proceeding to the user's right, clockwise in FIG. 2, that other paths may proceed to the user's left, upward, or at any suitable angle or direction of travel or rotation. As discussed further below, a user interface of the image capture device may show one or more graphical elements to aid the user 210 in keeping the camera level while rotating the camera along the path 230. For example, the user interface may include the display 114 and/or the I/O components 116 of the device 100. The camera may capture multiple images from multiple perspectives as the camera rotates along the path 230. The image capture device may combine the multiple images captured by the rotating camera into a 360 degree panorama image centered at point 240. Point 240 is 180 degrees from the starting point 220 along the path 230. To generate the panorama image, the image capture device may align edges of the captured images and combine them using suitable techniques (such as image stitching, stretching, warping, distortion, and so on) to generate the 360 degree panorama image.

As discussed above, it may be difficult for a user to center a panorama image as desired based on the user selecting an appropriate starting point. For example, for generating a 360 panorama image, the user must select a starting point 180 degrees from the desired point along a path the camera is rotated 360 degrees. For panorama images less than 360 degrees in FoV, this determination may be yet more complicated. Accordingly, the example implementations allow reception of an indication specifying a desired center point of the panorama image. Such a desired center point may also be referred to as a center region of interest (ROI). The captured images during rotation of the camera may then be automatically processed to generate a panorama image centered at the center ROI. The example implementations may thereby allow for simple and reliable selection of the desired center point of the panorama image while allowing a user to begin generation of the panorama image at arbitrary start points.

Figure 3:
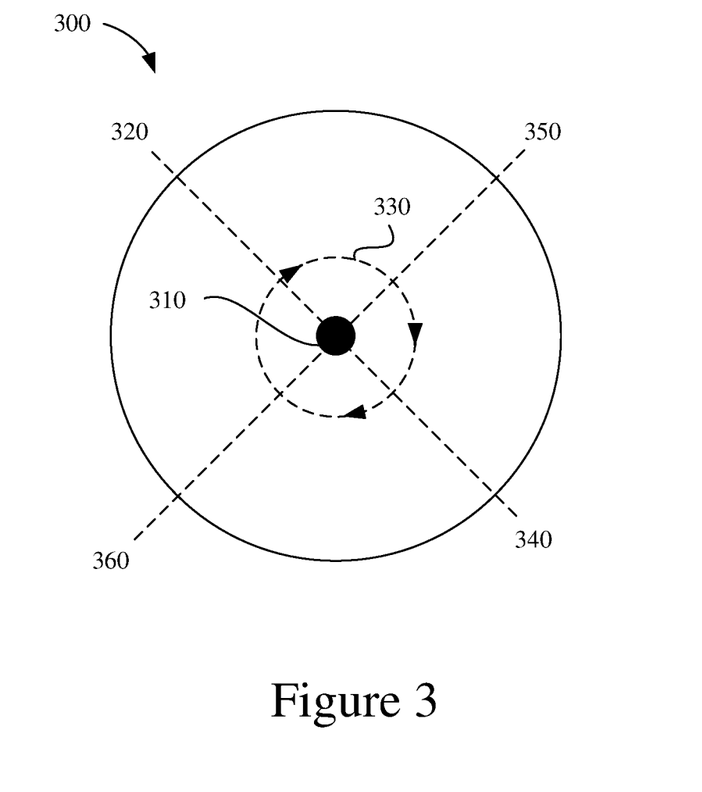
FIG. 3 shows a trajectory diagram of generating a 360 degree panorama image, according to some implementations.

FIG. 3 shows a trajectory diagram 300 of generating a 360 degree panorama image, according to some implementations. The trajectory diagram 300 shows an overhead view of a user 310 initiating generation of a 360 degree panorama image while facing an optical axis of a camera at the starting point 320. For example, the camera may be camera 102 of the device 100 of FIG. 1. During generation of the panorama image, the user 310 rotates the camera to the right, clockwise in FIG. 3, along a path 330 for a full 360 degree rotation, until the optical axis is again facing the starting point 320. For example, the path 330 may be a horizontal path for a horizontal panorama image, a vertical path for a vertical panorama image, or any other suitable path. Further, note that while the path 330 is shown as proceeding to the user's right, clockwise in FIG. 3, that other implementations may include paths proceeding to the user's left, upward, or at any suitable angle or direction of travel or rotation. As discussed further below, a user interface of the image capture device may show one or more graphical elements to aid the user 310 in keeping the camera level while rotating the camera along the path 330. The camera may capture multiple images from multiple perspectives as the camera rotates along the path 330. For example, the user interface may include the display 114 and/or the I/O components 116 of the device 100. For conventional panorama image generation techniques, the center point would be at point 340. However, during capture of the multiple images, an indication may be received, such as a user selection, an automatic selection, or another suitable indication, specifying the desired center point 350. After the camera has rotated 360 degrees, along the entire path 330, the image capture device may automatically process the multiple images into a 360 degree panorama image centered at point 350. Similar to FIG. 2, the image capture device may align edges of the captured images and combine them using suitable techniques such as image stitching to generate a 360 degree panorama image. Further, the image capture device may determine a split point 360, which is 180 degrees from the center point 350. The image capture device may then join a starting capture point of the panorama image to an ending capture point—in other words, joining the image captured just after starting generation of the panorama image at starting point 320 to the image captured just before reaching the starting point 320 after rotating the camera through the whole path 330. The image capture device may join the starting capture point to the ending capture point using image stitching, stretching, warping, distortion, or other suitable image joining techniques. The image capture device may also split the panorama image at the split point 360, to generate a panorama image centered at the desired center point 350.

Other aspects of the example implementations may allow for the automatic recentering of panorama images having fields of view less than 360 degrees. It is even more difficult for a user to determine an appropriate starting point for less than 360 degree panorama images using conventional techniques. The required starting point is not roughly 180 degrees from the desired center point, but half the total field of view from the desired center point—thus, for a 200 degree panorama image, the start point must be 100 degrees from the desired center point for conventional panorama image capture techniques. Example implementations may allow for reception of the indication of the center ROI during capture of the multiple images for generating the panorama image. As with the example described above with respect to FIG. 3, the panorama image may then be automatically generated to be centered at the center ROI. However, in contrast to the example of FIG. 3, generating the recentered panorama image may include cropping a portion of the captured images, so that the panorama image is centered at the center ROI.

Figure 4:
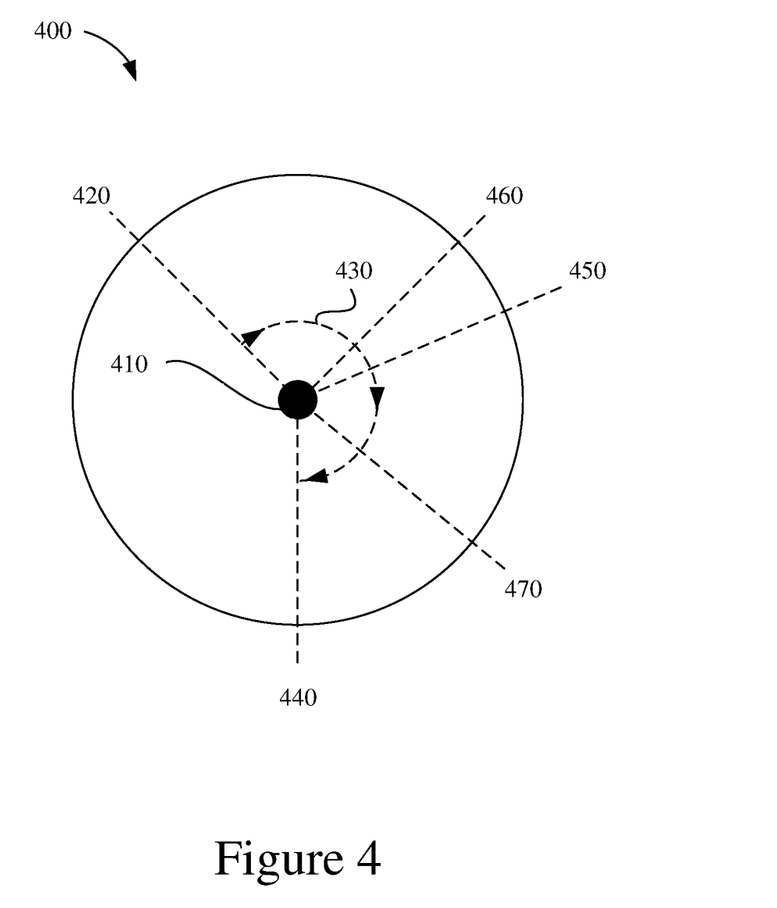
FIG. 4 shows a trajectory diagram of generating a less than 360 degree panorama image, according to some implementations.

FIG. 4 shows a trajectory diagram 400 of generating a less than 360 degree panorama image, according to some implementations. The trajectory diagram 400 shows an overhead view of a user 410 initiating generation of a less than 360 degree panorama image while facing an optical axis of a camera at the starting point 420. For example, the camera may be camera 102 of device 100 of FIG. 1. During generation of the panorama image, the user 410 rotates the camera to the right, clockwise in FIG. 4, along a path 430 for a less than 360 degree rotation, until the optical axis is facing a stopping point 440. For example, the path 430 may be a horizontal path for a horizontal panorama image, a vertical path for a vertical panorama image, or any other suitable path. Further, note that while the path 430 is shown as proceeding to the user's right, clockwise in FIG. 3, that other implementations may include paths proceeding to the user's left, upward, or at any suitable angle or direction of travel or rotation. As discussed further below, a user interface of the image capture device may show one or more graphical elements to aid the user 410 in keeping the camera level while rotating the camera along the path 430. For example, the user interface may include display 114 and I/O components 116 of the device 100 of FIG. 1. The camera may capture multiple images from multiple perspectives as the camera rotates along the path 430. For conventional panorama image capture techniques, the center point would be at point 450. However, during capture of the multiple images, an indication may be received, such as a user selection, an automatic selection, or another suitable indication, specifying the desired center point 460. After the camera has rotated along the entire path 430, the image capture device may automatically process the multiple images to generate a less than 360 degree panorama image centered at point 460. Similarly to FIG. 1, the image capture device may align edges of the captured images and combine them using suitable techniques such as image stitching, stretching, warping, distortion, or other suitable image joining techniques to generate the panorama image. In order to generate a recentered panorama image centered at point 460, a portion of the captured images may be cut or cropped. For example, an ending point 470 of the panorama image may be determined, and the portion of the images captured between ending point 470 and stopping point 440 may be cropped so that the panorama image may include images captured along the path 430 between starting point 420 and ending point 470. In this manner, the panorama image is centered at the desired center point 460 instead of the point 450.

Note that while the trajectory diagram 400 describes cropping portions of images captured between the ending point 470 and the stopping point 440—in other words, cropping a portion of captured images from the end of the path 430—in some other implementations a portion of captured images may instead be cropped from the beginning of an image capture path. For example, in some implementations a determination may be made as to whether the desired center point is closer to the starting capture point or the stopping capture point. When the desired center point is closer to the starting capture point, a portion of the captured images may be cropped from the end of the image capture path, as shown in FIG. 4. Alternatively, when the desired center point is closer to the stopping capture point, a portion of the images may instead be cropped from the beginning of the image capture path.

In some implementations, the desired center point may be required to be at least a minimum angular distance from the starting capture point or the ending capture point. For example, if a user indicates a desired center point too near the starting capture point, the resulting panorama image may be undesirably small. Accordingly, in some implementations, user indications of the desired center point may be ignored when the desired center point is less than a threshold angular distance from the starting capture point or the stopping capture point. In other words, when the desired center point is too close to the starting capture point or the stopping capture point, the panorama image may be generated in a conventional manner, rather than being automatically processed in order to center the generated panorama image at the desired center point.

As discussed above, generated panorama images may be undesirably small in FoV when a desired center point is selected to be too near the stopping capture point. In some implementations, when a desired center point is selected an indication may be provided to a user to continue rotating the camera, continuing to capture images so that the resulting panorama image has at least a threshold FoV. For example, if the threshold FoV is 100 degrees, then the indication may caution the user not to stop capturing images until the camera has rotated 50 degrees from the desired center point. Such an indication may be provided, for example, as a visual indication on a user interface of the image capture device, such as on a display of the device 100 of FIG. 1. The indication may also take any other suitable form, such as an audio indication.

The received indication specifying the center ROI may take any of multiple forms, in accordance with the example implementations. In some implementations the received indication may be a user input specifying the center ROI, such as a touch gesture on a touch sensitive user interface, such as display 114 of device 100. In other implementations the user input may indicate selection of a menu option or user interface button, or depression of a physical button or key on the image capture device. In some implementations, the user input may be a touch gesture anywhere on the touch sensitive user interface while the camera is facing the desired center ROI. In some implementations the user input may be a haptic gesture, a spoken command, a gesture detected from a second camera of the device 100, such as a gesture detected by a front-facing camera of the device 100. In some other implementations receiving the indication may include automatically determining the center ROI during generation of the panorama image, based on one or more characteristics of the captured plurality of images. The one or more characteristics may include depths of one or more objects in the captured plurality of images, for example as determined by one or more depth sensors of the device 100. In some implementation the center ROI may be determined as a point corresponding to a nearest object in the plurality of images of at least a threshold size. In other implementations the center ROI may be determined as a point corresponding to a largest object in a specified range of depths. In some other implementations, the center ROI may be determined based on one or more face detection operations. For example, if one or more faces are detected while capturing images for generating the panorama image, the center ROI may be determined at a location of one of the detected faces, such as at a nearest of the one or more detected faces, at a midpoint between two detected faces, and so on.

Figure 5:
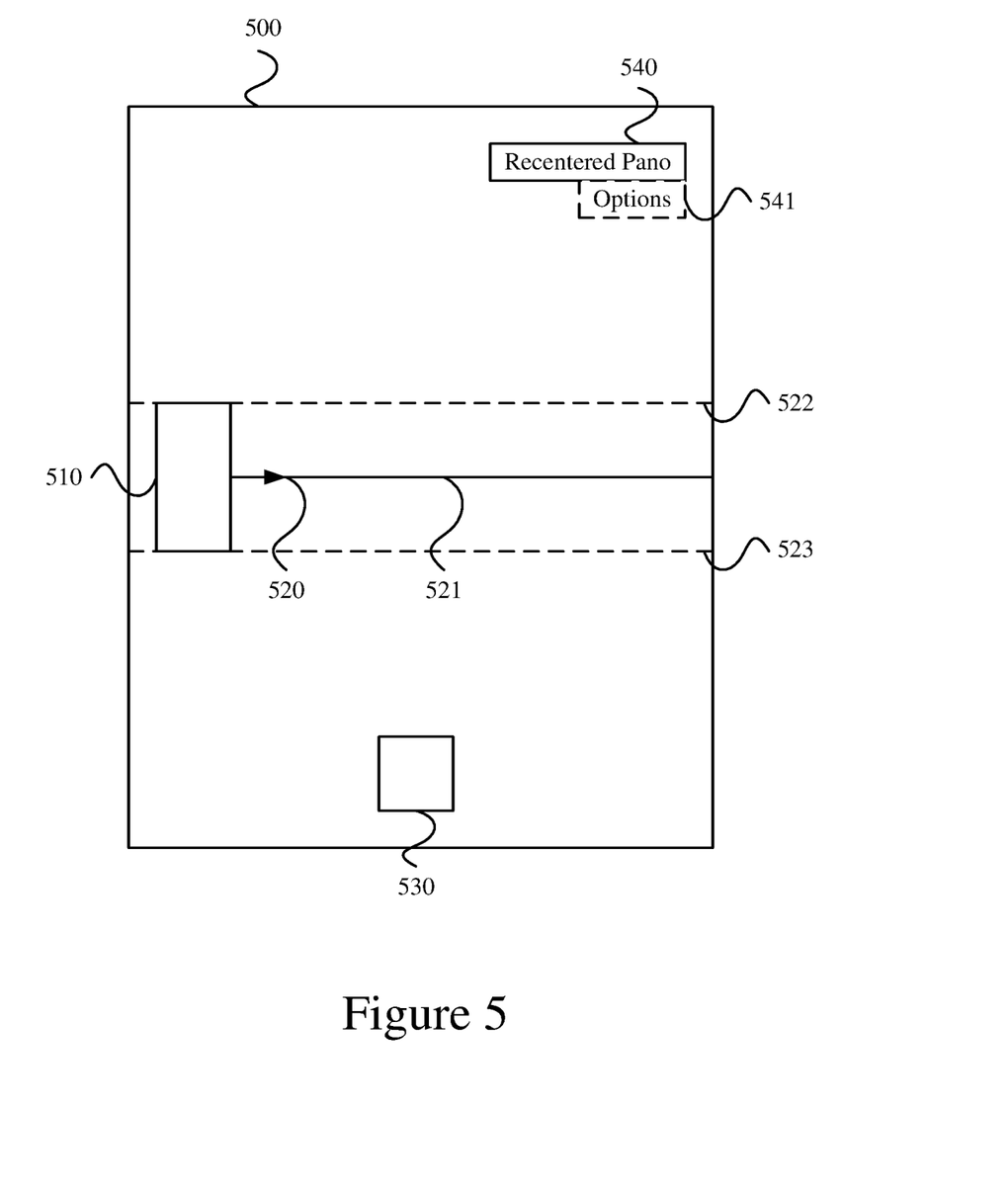
FIG. 5 shows an example user interface window for an image capture device, according to some implementations.

FIG. 5 shows an example user interface window 500 for an image capture device, according to some implementations. For example, the user interface window 500 may be displayed on the device 100 of FIG. 1. As mentioned above with respect to FIGS. 2-4, a user interface of the image capture device may show one or more graphical elements to aid the user in keeping the camera level while capturing a plurality of images for generating a panorama image. For example, a thumbnail image 510 may be shown on the user interface window 500, helping the user to keep the image frame of the image capture device at a constant level during image capture. Additional user guides may be depicted, such as a center level guide 520, which may indicate a current level of the image frame, for example using the arrow of center level guide 520. The center level guide 520 may also include a recommended level for the user—the center line 521 of center level guide 520. Thus, during capture of the plurality of images, the user may adjust the level of the image frame to keep the arrow aligned with the center line 521. The center level guide 520 may also include an upper frame indicator 522 and a lower frame indicator 523, representing recommended levels for the user to maintain the top and bottom of the image frame during capture of the plurality of images. The user interface window 500 may also include a button 530, which may be selected to initiate generation of a panorama image, to indicate a center ROI for the panorama image, or to make other selections.

In some implementations, the user interface window 500 may include a mode identification 540, indicating that the image capture device is in a mode configured to generate recentered panorama images. In some implementations prior to generating a panorama image, the image capture device may be placed into the mode for generating recentered panorama images. For example, a user input such as a button press, or selection of a menu option may place the image capture device into the mode for generating recentered panorama images. The mode identification 540 may indicate a current mode in which the image capture device is configured. In some implementations the mode identification 540 may further display mode options 541. Mode options 541 may indicate one or more currently enabled configuration options for the current mode. For example, the mode options 541 may indicate a currently enabled type of option for specifying the center ROI, such as via a user touch gesture, user button press, haptic gesture, spoken command, or automatic specification based on one or more characteristics of the plurality of captured images, as discussed above.

Figure 6:
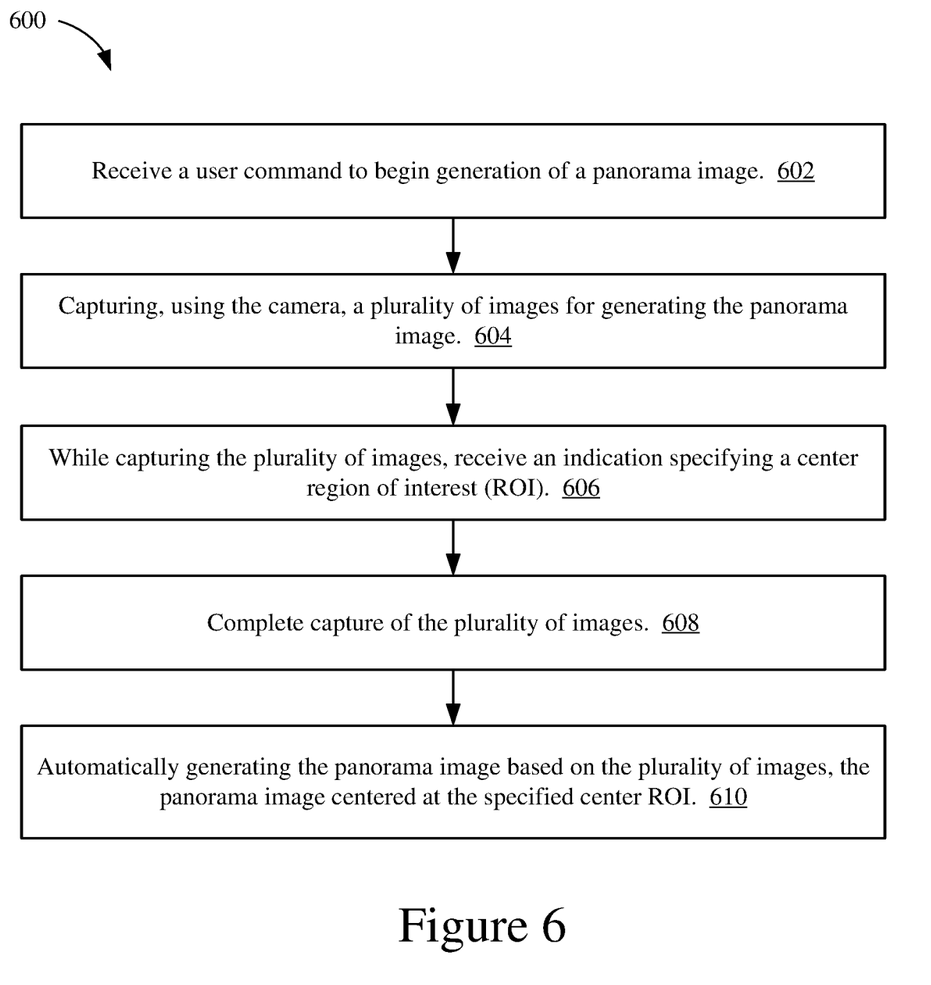
FIG. 6 is an illustrative flow chart depicting an example operation for generating a panorama image, according to some implementations.

FIG. 6 is an illustrative flow chart depicting an example operation 600 for generating a panorama image, according to some implementations. The operation 600 may be performed by any suitable image capture device including a camera and configured to generate panorama images. In some implementations the operation 600 may be performed by device 100 shown in FIG. 1. At block 602, the device 100 receives a user command to begin generation of a panorama image. At block 604, the device 100 captures a plurality of images, using the camera, for generating the panorama image. At block 606 the device 100 receives, during the capture of the plurality of images, an indication specifying a center region of interest. At block 608 the device 100 completes the capture of the plurality of images. At block 610 the device 100 automatically generates the panorama image based on the plurality of images, where the panorama image is centered at the specified center ROI.

In some aspects, the indication received in block 606 may be a user input specifying the center ROI, such as a touch gesture on a touch sensitive user interface of the device 100, such as a touch gesture at the center ROI of a preview displayed on the touch sensitive user interface, or indicating selection of a menu option on the touch sensitive user interface while the camera is directed at the center ROI. In some aspects, receiving the indication in block 606 may include automatically determining the center ROI based on one or more characteristics of the plurality of images, such as an estimated depth of one or more objects in the plurality of images.

In some aspects, the panorama image may be a 360 degree panorama image, and automatically generating the panorama image in block 610 may include determining a split point corresponding to the specified center ROI, determining a starting capture point and an ending capture point based on the split point, and generating the panorama image based on the starting capture point and the ending capture points.

In some aspects, the panorama image may be a less than 360 degree panorama image, and automatically generating the panorama image in block 610 may include comparing the specified center ROI to a maximal field of view of the panorama image, and cropping the captured panorama image to be centered at the specified center ROI.

In some aspects, prior to receiving the user command in block 602, the device 100 may receive user input indicating that the device 100 is to operate in a mode configured to generate recentered panorama images.

Figure 7:
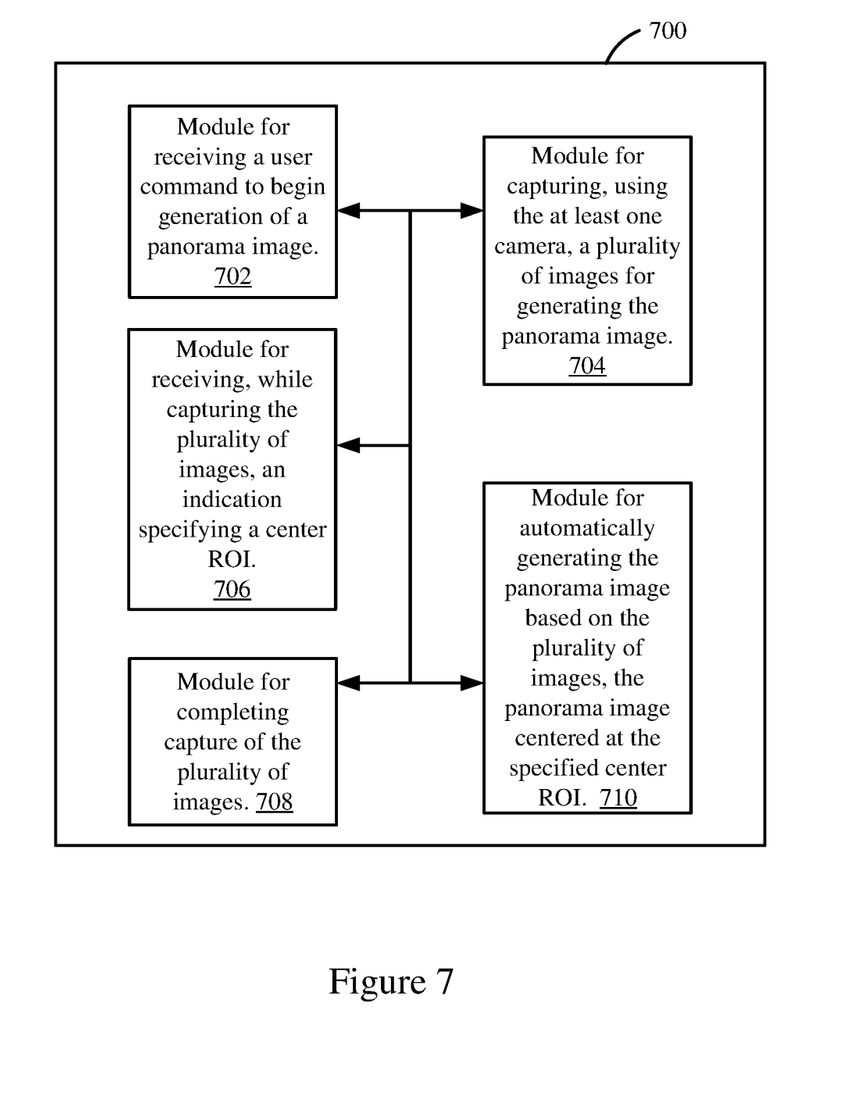
FIG. 7 shows a block diagram of an example device that supports generating a panorama image according to some implementations.

FIG. 7 shows a block diagram of an example device 700 that supports capturing a panorama image, according to some implementations In some implementations, the device 700 is configured to the process 600 described above with reference to FIG. 6. The device 700 may be an example implementation of the device 100 described above with reference to FIG. 1. For example, the wireless communication device 700 can be a chip, SoC, chipset, package or device that includes at least one processor (such as the processor 104), at least one memory (such as the memory 106), and that includes at least one camera (such as the camera 102).

The device 700 includes a module 702 for receiving a user command to begin generation of a panorama image, a module 704 for capturing, using the at least one camera, a plurality of images for generating the panorama image, a module 706 for receiving, during capture of the plurality of images, an indication specifying a center ROI, a module 708 for completing capture of the plurality of images, and a module 710 for automatically generating the panorama image based on the plurality of image, where the panorama image is centered at the specified center ROI. Portions of one or more of the modules 702, 704, 706, 708, and 710 may be implemented at least in part in hardware or firmware. For example, the modules 702 and 706 may be implemented at least in part by a display and input/output components, such as display 114 and input/output components 116. The modules 704 and 708 may be implemented at least in part by a camera, such as camera 102. In some implementations, at least some of the modules 702, 704, 706, 708, and 710 are implemented at least in part as software stored in a memory (such as the memory 106). For example, portions of one or more of the modules 702, 704, 706, 708, and 710 can be implemented as non-transitory instructions or "code" (such as instructions 108, executable by a processor (such as the processor 104) to perform the functions or operations of the respective module.

The module 702 is configured to receive a user command to begin generation of a panorama image. The module 704 is configured to capture a plurality of images, using the at least one camera, for generating the panorama image. The module 706 is configured to receive, during capture of the plurality of images, an indication specifying a center ROI. The module 708 is configured to complete capture of the plurality of images. The module 710 is configured to automatically generate the panorama image based on the plurality of images, where the panorama image is centered at the specified center ROI.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium (such as the memory 106 in the example device 100 of FIG. 1) comprising instructions 108 that, when executed by the processor 104 (or the controller 110 or the ISP 112), cause the device 100 to perform one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits, and instructions described in connection with the embodiments disclosed herein may be executed by one or more processors, such as the processor 104 or the ISP 112 in the example device 100 of FIG. 1. Such processor(s) may include but are not limited to one or more digital signal processors (DSPs), general purpose microprocessors, application specific integrated circuits (ASICs), application specific instruction set processors (ASICs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor and/or any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

While the present disclosure shows illustrative aspects, it should be noted that various changes and modifications could be made herein without departing from the scope of the appended claims. For example, one or more steps in the operation 600 may be omitted, or one or more additional processing steps may be added. Additionally, the functions, steps or actions of the method claims in accordance with aspects described herein need not be performed in any particular order unless expressly stated otherwise. For example, the steps of the described example operations, if performed by the device 100, the controller 110, the processor 104, and/or the ISP 112, may be performed in any order and at any frequency. Furthermore, although elements may be described or claimed in the singular, the plural is contemplated unless limitation to the singular is explicitly stated. Accordingly, the disclosure is not limited to the illustrated examples and any means for performing the functionality described herein are included in aspects of the disclosure.

The invention claimed is:

1. A method for generating a panorama image, the method performed by an image capture device including a camera, comprising:
    receiving a user command to begin generation of the panorama image;
    capturing, using the camera, a plurality of images for generating the panorama image;
    receiving a user input specifying a center region of interest (ROI) for centering the panorama image;
    completing capture of the plurality of images; and
    based on the user input specifying the center ROI, automatically generating the panorama image centered at the specified center ROI based on the plurality of images.

2. The method of claim 1, further comprising receiving the user input specifying the center ROI while capturing the plurality of images.

3. The method of claim 1, wherein the user input specifying the center ROI includes a touch gesture on a touch sensitive user interface of the image capture device.

4. The method of claim 3, wherein the touch gesture comprises a touch gesture at the center ROI of a preview displayed on the touch sensitive user interface.

5. The method of claim 3, wherein the touch gesture indicates a selection of a menu option on the touch sensitive user interface while the camera is directed at the center ROI.

6. The method of claim 1, wherein the panorama image is a 360 degree panorama image, and wherein automatically generating the panorama image comprises:
    determining a split point corresponding to the specified center ROI;
    determining a starting capture point and an ending capture point based on the split point; and
    generating the panorama image based on the starting capture point and the ending capture point.

7. The method of claim 1, wherein the panorama image is a less than 360 degree panorama image, wherein automatically generating the panorama image comprises:
    comparing the specified center ROI to a maximal field of view of the panorama image; and
    cropping the panorama image to be centered at the specified center ROI.

8. The method of claim 1, further comprising, prior to receiving the user command to begin generation of the panorama image, receiving a user input configuring the camera to operate in a mode configured to generate recentered panorama images.

9. An image capture device, comprising:
    one or more cameras;
    one or more processors configured to:
        receive a user command to begin generation of a panorama image using the one or more cameras;
        capture, using the one or more cameras, a plurality of images for generating the panorama image;
        receive a user input receiving an indication specifying a center region of interest (ROI) for centering the panorama image;
        completing capture of the plurality of images; and
        based on the user input specifying the center ROI, automatically generate the panorama image centered at the specified center ROI based on the plurality of images.

10. The image capture device of claim 9, wherein the one or more processors are configured to receive the user input specifying the center ROI while capturing the plurality of images.

11. The image capture device of claim 9, wherein the user input specifying the center ROI includes a touch gesture on a touch sensitive user interface of the image capture device.

12. The image capture device of claim 11, wherein the touch gesture comprises a touch gesture at the center ROI of a preview displayed on the touch sensitive user interface.

13. The image capture device of claim 11, wherein the touch gesture indicates a selection of a menu option on the touch sensitive user interface while the camera is directed at the center ROI.

14. The image capture device of claim 9, wherein the panorama image is a 360 degree panorama image, and wherein the one or more processors are configured to:
    determine a split point corresponding to the specified center ROI;
    determining a starting capture point and an ending capture point based on the split point; and
    generate the panorama image based on the starting capture point and the ending capture point.

15. The image capture device of claim 9, wherein the panorama image is a less than 360 degree panorama image, and wherein the one or more processors are configured to:
    compare the specified center ROI to a maximal field of view of the panorama image; and
    crop the panorama image to be centered at the specified center ROI.

16. The image capture device of claim 9, wherein the one or more processors are configured to, prior to receiving the user command to begin generation of the panorama image, receive a user input configuring the camera to operate in a mode configured to generate recentered panorama images.

17. A non-transitory computer-readable storage medium storing instructions that, when executed by one or more processors of an image capture device including a camera, cause the image capture device to perform operations comprising:
    receiving a user command to begin generation of a panorama image;
    capturing, using the camera, a plurality of images for generating the panorama image;
    receiving a user input specifying a center region of interest (ROI) for centering the panorama image;
    completing capture of the plurality of images; and
    based on the user input specifying the center ROI, automatically generating the panorama image centered at the specified center ROI based on the plurality of images.

18. The non-transitory computer-readable storage medium of claim 17 wherein execution of the instructions causes the image capture device to perform operations further comprising: receiving the user input specifying the center ROI during capture of the plurality of images.

19. The non-transitory computer-readable storage medium of claim 18, wherein the user input specifying the center ROI includes a touch gesture on a touch sensitive user interface of the image capture device.

20. The non-transitory computer-readable storage medium of claim 19, wherein the touch gesture comprises a touch gesture at the center ROI of a preview displayed on the touch sensitive user interface.

21. The non-transitory computer-readable storage medium of claim 19, wherein the touch gesture indicates a selection of a menu option on the touch sensitive user interface while a camera of the image capture device is directed at the center ROI.

22. The non-transitory computer-readable storage medium of claim 17, wherein the panorama image is a 360 degree panorama image, and wherein execution of the instructions for automatically generating the panorama image causes the image capture device to perform operations further comprising:
    determining a split point corresponding to the specified center ROI;
    determining a starting capture point and an ending capture point based on the split point; and
    generating the panorama image based on the starting capture point and ending capture point.

23. The non-transitory computer-readable storage medium of claim 17, wherein the panorama image is a less than 360 degree panorama image, wherein execution of the instructions for automatically generating the panorama image causes the image capture device to perform operations further comprising:
    comparing the specified center ROI to a maximal field of view of the panorama image; and
    cropping the panorama image to be centered at the specified center ROI.

24. The non-transitory computer-readable storage medium of claim 17, wherein execution of the instruction causes the image capture device to perform operations further comprising, prior to receiving the user command to begin generation of the panorama image, receiving user input configuring the image capture device to operate in a mode configured to generate recentered panorama images.

25. An image capture device, comprising:
    one or more cameras;
    means for receiving a user command to begin generation of a panorama image;
    means for capturing, using the one or more cameras, a plurality of images for generating the panorama image;
    means for receiving a user input specifying a center region of interest (ROI) for centering the panorama image;
    means for completing capture of the plurality of images; and
    means for, based on the user input specifying the center ROI, automatically generating the panorama image centered at the specified center ROI based on the plurality of images.

26. The image capture device of claim 25, further comprising receiving the user input specifying the center ROI while capturing the plurality of images.

27. The image capture device of claim 26, wherein the user input specifying the center ROI includes a touch gesture on a touch sensitive user interface of the image capture device.

28. The image capture device of claim 27, wherein the touch gesture comprises at least one of touch gesture at the center ROI of a preview displayed on the touch sensitive user interface and a selection of a menu option on the touch sensitive user interface while the camera is directed at the center ROI.

29. The image capture device of claim 25, wherein the panorama image is a 360 degree panorama image, and wherein the means for automatically generating the panorama image comprises:
    means for determining a split point corresponding to the specified center ROI;
    means for determining a starting capture point and an ending capture point based on the split point; and
    means for generating the panorama image based on the starting capture point and the ending capture point.

30. The image capture device of claim 25, wherein the panorama image is a less than 360 degree panorama image, wherein the means for automatically generating the panorama image comprises:

means for comparing the specified center ROI to a maximal field of view of the panorama image; and     means for cropping the panorama image to be centered at the specified center ROI.

\* \* \* \* \*